United States Patent
Lescourret

(10) Patent No.: US 6,754,609 B2
(45) Date of Patent: Jun. 22, 2004

(54) MAGNETIC DEVICE AND METHOD FOR DETERMINING ORIENTATION

(75) Inventor: Jean-Louis Lescourret, Merignac (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 10/240,755

(22) PCT Filed: Apr. 6, 2001

(86) PCT No.: PCT/FR01/01062
§ 371 (c)(1),
(2), (4) Date: Oct. 11, 2002

(87) PCT Pub. No.: WO01/79778
PCT Pub. Date: Oct. 25, 2001

(65) Prior Publication Data
US 2003/0139895 A1 Jul. 24, 2003

(30) Foreign Application Priority Data
Apr. 14, 2000 (FR) .............................. 00 04861

(51) Int. Cl.$^7$ .................. G01C 17/00; G01C 19/00; G01C 9/00; G06F 15/00
(52) U.S. Cl. ................. 702/150; 702/152; 702/158; 324/207.17; 324/207.12; 600/437; 342/463
(58) Field of Search ............................ 702/152, 150, 702/158; 324/207.17, 207.12; 600/437; 342/463

(56) References Cited

U.S. PATENT DOCUMENTS

| 4,314,251 A | * | 2/1982 | Raab | 342/463 |
|---|---|---|---|---|
| 5,767,669 A | * | 6/1998 | Hansen et al. | 324/207.12 |
| 6,172,499 B1 | * | 1/2001 | Ashe | 324/207.12 |
| 6,246,231 B1 | * | 6/2001 | Ashe | 324/207.17 |
| 6,487,516 B1 | * | 11/2002 | Amorai-Moriya | 702/152 |
| 6,528,991 B2 | * | 3/2003 | Ashe | 324/207.17 |
| 6,549,004 B1 | * | 4/2003 | Prigge | 324/207.17 |
| 2003/0013958 A1 | * | 1/2003 | Govari et al. | 600/437 |
| 2003/0076106 A1 | * | 4/2003 | Mercer | 324/326 |
| 2003/0184285 A1 | * | 10/2003 | Anderson et al. | 324/207.17 |

* cited by examiner

Primary Examiner—John Barlow
Assistant Examiner—Aditya S Bhat
(74) Attorney, Agent, or Firm—Oblon, Spivak, McClelland, Maier & Neustadt, P.C.

(57) ABSTRACT

The invention relates to a device for measuring the position and the orientation of a mobile object with respect to a fixed structure, in a disturbed magnetic environment, of the type comprising:—a first assembly of orthogonal coils ($12_1$ to $12_3$) for emitting magnetic field(s), secured to the fixed structure, defining a reference frame;—a second assembly of orthogonal coils for receiving magnetic field(s), secured to the object, and forming a sensor (14), each of the coils belonging to a channel of the sensor. Such a device comprises means:—(1) of simultaneous and continuous emission of fields, on the coils of the first assembly;—of measurement, on the channels of the sensor, of the vector sum of the fields emitted and of disturbing fields produced by the environment;—of evaluation of the disturbing fields;—of estimation of the fields emitted in an undisturbed environment, by elimination of the disturbing fields evaluated in the vector sum;—(2) of calculation of the position and the orientation of the object in the reference frame.

18 Claims, 3 Drawing Sheets

MAGNETIC DEVICE AND METHOD FOR DETERMINING ORIENTATION

The domain of the invention is the measurement of the position and the orientation of a mobile body, which moves in translation and in rotation with respect of a fixed body or structure.

In particular, the invention relates to the determination of the posture of the helmet of a pilot of military aircraft, in which the angular position of a target is determined by aiming, through a system comprising the pilot's helmet visualisation display unit.

The operation of such a system is recalled briefly below: via an ancillary collimator device, the pilot sees, through his semi-reflecting visor secured to the helmet, on the viewing axis, the image of a reticle projected to infinity superimposed with the outside scene. When he wishes to designate a target, the pilot makes this reticle coincide with the target and signals that coincidence is achieved, by means for example of a push-button control provided for this purpose.

Provided that the exact angular position of the helmet is referenced at the moment that coincidence is signaled, it is possible to determine, with respect to the aircraft, the direction of aim and to designate the objective to a weapon system, or to point an optical system for example in this direction.

A device for measuring orientation and position of the helmet of the pilot in a reference frame tied to the aircraft can consist of an orientation and position sensor made up of three orthogonal electromagnetic coils and placed on the helmet, and of an emitter, situated at a fixed point of the cabin, and made up of three other electromagnetic coils.

The process then consists in passing an electric current through each coil of the emitter (forming a substantially orthogonal fixed trihedron). These currents engender three magnetic fields which are sensed by the coils of the sensor (forming a substantially orthogonal moving trihedron tied to the helmet). The analysis of these magnetic fields makes it possible to determine the position and the orientation of the moving trihedron with respect to the fixed trihedron.

In this domain of application in particular, it is vital to obtain an accurate measurement of the magnetic fields emitted by the fixed emitter, and detected by the sensor tied to the helmet, so as to accurately designate, to a weapon system, the objective selected by the pilot.

The existence has long been known of magnetic phenomena liable to arise in conducting bodies and in bodies of ferromagnetic type. It is thus known that in the presence of an external magnetic field, induced currents, of the type of eddy currents, appear in the conducting elements. It is also known that magnetic inductions arise in permeable materials, such as steels or materials of magnetic susceptibility of iron/nickel type.

When one wishes to evaluate a magnetic field in an environment exhibiting conductors and/or bodies of ferromagnetic type, it is therefore very difficult to obtain an accurate measurement, by reason of the considerable field disturbances caused by these induced fields.

Now, the cockpits of fighter planes or combat helicopters comprise numerous conducting and/or ferromagnetic elements which, in particular in the presence of magnetic fields emitted by the three coils of the emitter, create strong magnetic disturbances, and falsify the measurement.

It is therefore very difficult, in these disturbed environments, to obtain operation of the helmet viewfinder which satisfies the specifications of static accuracy throughout the volume swept by the orientation and position sensor.

It has therefore been envisaged to compensate for the effects of the magnetic disturbances in the measurements, by attempting to obtain a modeling of the magnetic disturbances, according to several complex methods of processing, on the basis of a very accurate map of the actual environment of the system.

A drawback of these prior art techniques, which implement a modeling of the disturbing fields, is that the products, and in particular the helmet viewfinders obtained according to these techniques, are very difficult to implement. Specifically, these products must be able to adapt to carriers of any type. Moreover, the sensitivity of the errors with respect to the stability of the magnetic environment remains very considerable.

A first method of compensating for the magnetic disturbances consists in producing a magnetic map of the environment of the position and orientation sensor, so as to construct a reference table encompassing the values of the disturbing fields (otherwise known as a "lookup table") or a reference model. This table is then used to correct the sensor's position and orientation measurements, during operation. It is therefore necessary to immobilize the apparatus on the ground for several days so as to be able to compile this map, for each pilot station, this being unacceptable in numerous situations, and in particular in the case discussed hereinabove of military equipment.

A drawback of this prior art technique is therefore that it is tedious, and very lengthy to implement.

Another drawback of this prior art technique is that it is not suited to possible variations in the environment of the sensor. In particular, the reference table ("lookup table"), or the reference model, loses some of its value should an object be moving within the cockpit (such as the movement of the pilot's adjustable seat, for example) or should a piece of equipment be added subsequently to the fighter plane or the compact helicopter, since the accuracy rating then decreases.

Several other techniques have been developed for compensating for the magnetic disturbances created by the eddy currents induced in conductors.

A first method, described in particular in patent document U.S. Pat. No. 4,829,250, consists in emitting magnetic fields alternating at harmonic frequencies, and in determining by extrapolation to low frequency, where the disturbances of the eddy effects are negligible, the value of the orientation from the orientations determined previously for each of the harmonic frequencies, as if there were just a single frequency for each estimation. Specifically, the magnetic disturbances due to eddy currents depend on the frequency of the magnetic field, and on the conductivity of the material in which they arise. It has been noted that these disturbances decrease with frequency, vanishing at zero frequency.

A drawback of this prior art technique is that it is not suited to the presence of ferromagnetic materials in the environment of the position and orientation sensor. In particular, it does not allow efficient filtering of the magnetic disturbances due to ferromagnetic materials, which may be considerable at low frequency.

A second method for compensating for the disturbances due to eddy currents, described in particular in patent documents U.S. Pat. Nos. 4,849,692 and 4,945,305, consists in emitting continuous magnetic fields (pulses) at the level of the emitter. These may have a permanent component, and the technique then consists in waiting for the eddy currents to attenuate over time in order to perform the measurement at the level of the sensor. The pulse must be sufficiently long over time for the eddy currents to have time to attenuate before the measurement is performed, or for the estimation of the steady state value to be accurate.

A drawback of this prior art technique is that the measurements are performed at rates which do not allow the steady state to be reached and the accuracy is insufficient. If one were to wait for the steady state, this would excessively limit the dynamic measurement range.

Another drawback of this prior art technique is that it is not suited to the presence, in the environment of the position and orientation sensor, of bodies of ferromagnetic type. Specifically, the disturbances of ferromagnetic origin depend on the magnetic permeability of the material and on the frequency of the excitation field, so that the magnetic disturbances decrease as the frequency increases, according to an inverse behavior to that of the eddy currents.

Yet another drawback of this prior art technique is that it is not suited to conducting metals in which the duration required for the attenuation of the eddy currents is high.

Techniques have also been envisaged for compensating for the magnetic disturbances due to bodies of ferromagnetic type, and in particular, it has been envisaged to emit magnetic fields at a high frequency, for example of the order to 8 to 14 kHz. Specifically, at such frequencies, the disturbances due to bodies of ferromagnetic type are negligible.

A drawback of this prior art technique is that it does not make it possible to compensate for the magnetic disturbances due to the eddy currents, which are considerable at high frequency.

Another drawback related to the modeling of the disturbing fields of ferromagnetic origin is that it is very difficult to determine a model of the remanent magnetization of objects of ferromagnetic type. Specifically, the remanent magnetization depends on the metallurgical properties of the object considered, as well as on its thermal, mechanical and geomagnetic past. Its intensity and its direction are often unknown for a particular object.

Most of these prior art techniques have, moreover, for common characteristic, to use time-division multiplexing operation. A measurement cycle for the orientation and the position of the sensor is split up into three subcycles of measurement proper, implementing the emission of a magnetic field by each of the channels of the emitter, and a calibration subcycle, in the course of which no magnetic field is emitted. According to these techniques, the calibration phases presuppose the temporary interruption of emission, and hence of the operation of the sensor.

A drawback of these prior art techniques is, consequently, that the period of the measurement or calibration subcycles is small since these subcycles are four times shorter than the output period of the measurement, which must itself be small enough not to induce considerable delays between the actual quantities and the quantities measured by the system of the helmet viewfinder (referred to as trail effects). These delays in fact have physiological effects on the pilot, who receives display information on the viewfinder of his helmet, at a rate equal to the output period of the sensor position and orientation information.

To reduce these trail effects as far as possible, it has been attempted, according to the prior art techniques, to reduce the output period of the information.

A drawback of this reduction in the output period of the information is that it entails a decrease in the signal-to-noise ratio of the magnetic measurement of the sensor. Now, such a decrease is not acceptable in numerous situations, and in particular in the case discussed hereinabove of military equipment, where the signal-to-noise ratio must necessarily be optimized so as thus to obtain the maximum accuracy.

Yet another drawback of the prior art techniques is that the measurements of the three channels of the sensor are not simultaneous, thereby generating errors, in the dynamic state of the head, whose operational movements may reach a speed substantially equal to 120° per second.

The objective of the invention is in particular to alleviate these drawbacks of the prior art.

More precisely, an objective of the invention is to provide a robust and environmentally insensitive device and process for filtering magnetic disturbances, decreasing the implementational and usage constraints, and hence costs.

Another objective of the invention is to implement such a device and such a process for filtering magnetic disturbances, operating in real time.

Another objective of the invention is to implement such a device and such a process for filtering magnetic disturbances which makes it possible to improve helmet viewfinders, used in particular in fighter planes and combat helicopters.

Yet another objective of the invention is to provide a process for filtering magnetic disturbances, which makes it possible to obtain a helmet viewfinder of simplified operational integration into cockpits.

Yet another objective of the invention is to provide such a device and such a process for filtering magnetic disturbances which makes it possible to obtain a helmet viewfinder of reduced cost of production, implementation and operational use.

The objective of the invention is also to implement such a device and such a process for filtering magnetic disturbances, which makes it possible to raise the performance in terms of static and dynamic accuracy of helmet viewfinders.

Another objective of the invention is to provide such a device and such a process for filtering magnetic disturbances, which is suited to the variations in the disturbances, due for example to modifications over time of the characteristics of the materials or of the conducting environment, to the adjustable equipment or the mobile disturbing pieces.

Yet another objective of the invention is to implement such a device and such a process for filtering magnetic disturbances which is suited to helmet viewfinders, which makes it possible in particular to reduce the immobilization time of aircraft or helicopters on the ground by eliminating the magnetic maps.

These objectives, as well as others which will become apparent subsequently are achieved according to the invention, with the aid of a device for measuring the position and the orientation of a mobile object with respect to a fixed structure, in a disturbed magnetic environment, of the type comprising:

a first assembly of at least two orthogonal coils for emitting predetermined magnetic field(s), secured to said fixed structure, and defining a reference frame;

a second assembly of at least two orthogonal coils for receiving magnetic field(s), secured to said mobile object, and forming a sensor, each of said coils belonging to a channel of said sensor.

The device according to the invention comprises:

means of simultaneous and continuous emission of predetermined magnetic fields, on each of the coils of said first assembly;

first means of measurement, on each of said channels of said sensor, of the vector sum of said predetermined magnetic fields emitted and of disturbing fields produced by the environment of said device;

means of evaluation of said disturbing fields;
first means of estimation of said predetermined magnetic fields emitted in an undisturbed magnetic environment, by elimination of said disturbing fields evaluated in said vector sum;
means of calculation of the position and the orientation of said first object in said reference frame, from said estimation of said predetermined magnetic fields.

Thus, the invention is founded on a wholly novel and inventive "continuous" approach to the measurement of the position and the orientation of a mobile object with respect to a fixed structure, implementing a filtering of the magnetic disturbances in an environment comprising conducting bodies or bodies of ferromagnetic type.

Specifically, the object of the invention is in particular to identify and filter the magnetic disturbances induced, in real time, so as to render the system insensitive to these disturbances, and thus to ensure operation identical to operation in free space.

According to a first advantageous characteristic of the invention, the means of evaluation of the disturbing fields comprise means of projection of the vector sum onto a first basis of disjoint orthonormal signals in the space k/T, on the one hand, where k is an integer and where T is the period of integration of the measurement of the vector sum, and onto a second basis which is the Hilbert transform of the first basis, on the other hand.

It is thus simple to identify the spectrum of the signals received on the coils of the second assembly, and hence to separate, in the vector sum, the terms relating to each of the coils of the first assembly.

According to a second advantageous characteristic of the invention, the means of evaluation of the disturbing fields comprise means of identification, within the projected vector sum, of the elements varying in the space k/T.

Specifically, the invention uses the property according to which the fields emitted by the coils of the first assembly, in free space, are constant in the space k/T. The identification of the elements of the vector sum varying in the space k/T therefore makes it possible to determine the disturbing fields created by the environment of the device.

Advantageously, the predetermined magnetic fields emitted are obtained by injection of currents into the coils of the first assembly, and are proportional to the injected currents.

This characteristic of the invention advantageously makes it possible to regard the disturbing fields created by the environment of the device as a linear transformation of the currents injected into the coils of the first assembly. More precisely, the disturbing fields are a filtered version of the currents injected, in the conventional sense of filtering.

According to an advantageous technique of the invention, the means of evaluation comprise second means of estimation of a frequency model of the disturbing fields or of a frequency model of transfer functions defined by a ratio of the disturbing fields to the injected currents.

Assuming that the currents injected into the coils of the first assembly are unitary and constant as a function of k/T, the invention preferably implements means of estimation of a frequency model of the disturbing fields. In the converse case where the currents injected are not constant in the space k/T, a frequency model of the transfer functions defined by the ratio of the disturbing fields to the currents injected into the coils of the first assembly is preferably determined. Advantageously, the frequency model of the transfer functions comprises first terms for modeling the transfer functions of the disturbing effects of the type of eddy effects $\vec{B}_{EF}(\vec{x}, j\omega)$, and second terms for modeling the transfer functions of the disturbing effects of ferromagnetic type $\vec{B}_{FE}(\vec{x}, J\omega)$, it being possible for the first and second modeling terms to be polynomials in k/T or of the type:

$$\vec{B}_{EF}\left(\vec{x}, j\frac{k}{T}\right) = \vec{B}_{EF}(\vec{x}) * \frac{jk\tau_{ef}}{T + jk\tau_{ef}}$$

$$\vec{B}_{FE}\left(\vec{x}, j\frac{k}{T}\right) = \vec{B}_{FE}(\vec{x}) * \frac{T}{T + jk\tau_{fe}}$$

where $\tau_{ef}$ and $\tau_{fe}$ denote time constants characteristic of the materials in which the eddy effects and ferromagnetic effects respectively arise, where k is an integer, and where T is the period of integration of the measurement of the vector sum.

According to an advantageous variant of the invention, the predetermined magnetic fields emitted are orthogonal pseudorandom fields, whose spectral distribution in terms of amplitude is proportional to that of the injected currents.

This characteristic of orthogonality of the magnetic fields emitted is especially advantageous for separating and extracting, from the vector sum received, the terms relating to each of the coils of the first assembly. In particular, the orthogonality of the magnetic fields emitted makes it possible to implement temporal methods, for example founded on parametric models of the signals, for separating and extracting the components relating to each of the emission coils, within the vector sum.

Advantageously, the predetermined magnetic fields emitted have disjoint spectral supports.

This characteristic of the invention is especially advantageous when the methods implemented for separating and extracting, from within the vector sum, the components relating to each of the coils of the first assembly, are spectral methods.

According to an advantageous characteristic of the invention, the first assembly comprises three orthogonal coils for emitting predetermined magnetic field(s), and the second assembly comprises three orthogonal coils for receiving magnetic field(s).

This characteristic of the invention is especially advantageous for determining the orientation of a mobile system with respect to a benchmark, and in particular for helmet viewfinders used in fighter planes or combat helicopters, which constitute a favored domain of application of the invention. Specifically, the analysis of the magnetic fields emitted by the first assembly forming an emitter, and measured by the second assembly forming a sensor, makes it possible to determine the position and the orientation of the moving trihedron of the sensor with respect to the fixed trihedron of the emitter.

According to an advantageous variant of the invention, the predetermined magnetic fields emitted exhibit respectively at least two reference frequencies, said reference frequencies being situated in a chosen spectral domain while taking account of the environment of the device, in such a way that the disturbing fields alter greatly in the relevant spectral domain.

In this way, it is easy to identify, in the vector sum received by the coils of the second assembly, the terms relating to the disturbing fields, which are distinguished from the fields emitted by the coils of the first assembly, by a strong variation in the relevant spectral domain.

Advantageously, the predetermined magnetic fields emitted exhibit respectively at least four reference frequencies.

According to an advantageous characteristic of the invention, the reference frequencies are multiples of a predetermined frequency, the predetermined frequency being a submultiple of a frequency lying between 40 and 70 Hz.

Obviously, this characteristic of the invention is especially advantageous when the predetermined frequency is a submultiple of 50 Hz or of 60 Hz.

Advantageously, the device according to the invention furthermore comprises:
- second means of measurement and of calibration of said injected currents;
- third means of measurement and of calibration of the electrical quantities emanating from said channels of said sensor;
- means of digital acquisition of said emitted fields, with the acquisition period $T_E$;
- means of compensation of the transfer functions of said channels of said sensor.

According to an advantageous variant of the invention, the means of digital acquisition are preceded by at least one anti-aliasing filter.

According to an advantageous characteristic of the invention, the injected currents are formed of a linear combination of first components of the type:

$$i_1(n,k) = \sum_{k'=0}^{k'=K} a_{1,k} \sin\left(\frac{2\pi}{T}(k)nT_e\right)$$

$$i_2(n,k) = \sum_{k'=0}^{k'=K} a_{2,k} \sin\left(\frac{2\pi}{T}(k)nT_e\right)$$

$$i_3(n,k) = \sum_{k'=0}^{k'=K} a_{3,k} \sin\left(\frac{2\pi}{T}(k)nT_e\right)$$

where $k = k_1 + lk'$, $l \geq 3$, $k_1$, $k_2$, $k_3$, $K$, $l$, and $n$ are integers, the coefficients $a_{jk}$ are non zero for particular values of k, $T_E$ is the period of acquisition of said emitted predetermined fields, and $\forall i, j \in [1;3]$, $|k_i - k_j| = E(l/3)$, where E denotes the integer part function.

Thus, the magnetic fields emitted by the coils of the first assembly are pseudorandom fields proportional to the components $i_1(n,k)$, $i_2(n,k)$ and $i_3(n,k)$.

Advantageously, the means of the evaluation of the disturbing fields furthermore comprise;
- means of projection of the vector sum, on the one hand, onto a first basis of the injected currents, and on the other hand onto the Hilbert transform of this first basis, in such a way as to separate the vector sum into components, each of these components corresponding to the field emitted by one of the coils of the first assembly;
- means of reconstruction, over a temporal support T and at each acquisition period $T_E$, of the components of the vector sum over the first basis of the injected currents and over the Hilbert transform of this first basis;
- means of construction, in the space k/T, from the components reconstructed over the first basis, and over the Hilbert transform of the first basis, of two 3×3 matrices, the nine terms of each of these matrices being functions of the variable k/T, where k is an integer bounded above by $T/T_E$.

The invention thus makes it possible to deduce the 3×3 matrix, estimated from the matrix of the emitter-sensor couplings in free space, and from which can be calculated the position and the orientation of the sensor in the benchmark of the emitter.

According to an advantageous variant, the device according to the invention furthermore comprises means of digital filtering, aimed at eliminating any disturbances radiated in the environment of said device.

The invention also relates to a process for measuring the position and the orientation of a mobile object with respect to a fixed structure, in a disturbed magnetic environment, a first assembly of at least two orthogonal coils for emitting predetermined magnetic field(s), secured to the fixed structure, defining a reference frame, and a second assembly of at least two orthogonal coils for receiving magnetic field(s), secured to the mobile object, and forming a sensor, each of the coils belonging to a channel of the sensor.

Such a process according to the invention comprises the following steps:
- simultaneous and continuous emission of predetermined magnetic fields, on each of the coils of the first assembly;
- measurement, on each of the channels of the sensor, of the vector sum of the predetermined magnetic fields emitted and of disturbing fields produced by the environment of the device;
- evaluation of the disturbing fields;
- estimation of the predetermined magnetic fields emitted in an undisturbed magnetic environment, by elimination of the disturbing fields evaluated in the vector sum;
- calculation of the position and the orientation of the first object in the reference frame, from the estimation of the predetermined magnetic fields.

Other characteristics and advantages of the invention will become more clearly apparent on reading the following description of a preferred embodiment, given by way of simple nonlimiting illustrative example, and of the appended drawings, among which:

The general principle of the invention is founded on the fact that, on the one hand, the magnetic fields emitted in free space are proportional to the currents flowing through the coils which generate them, and that, on the other hand, the disturbing fields which arise in the environment of the coils are a linear transformation of these currents.

Figure 1:
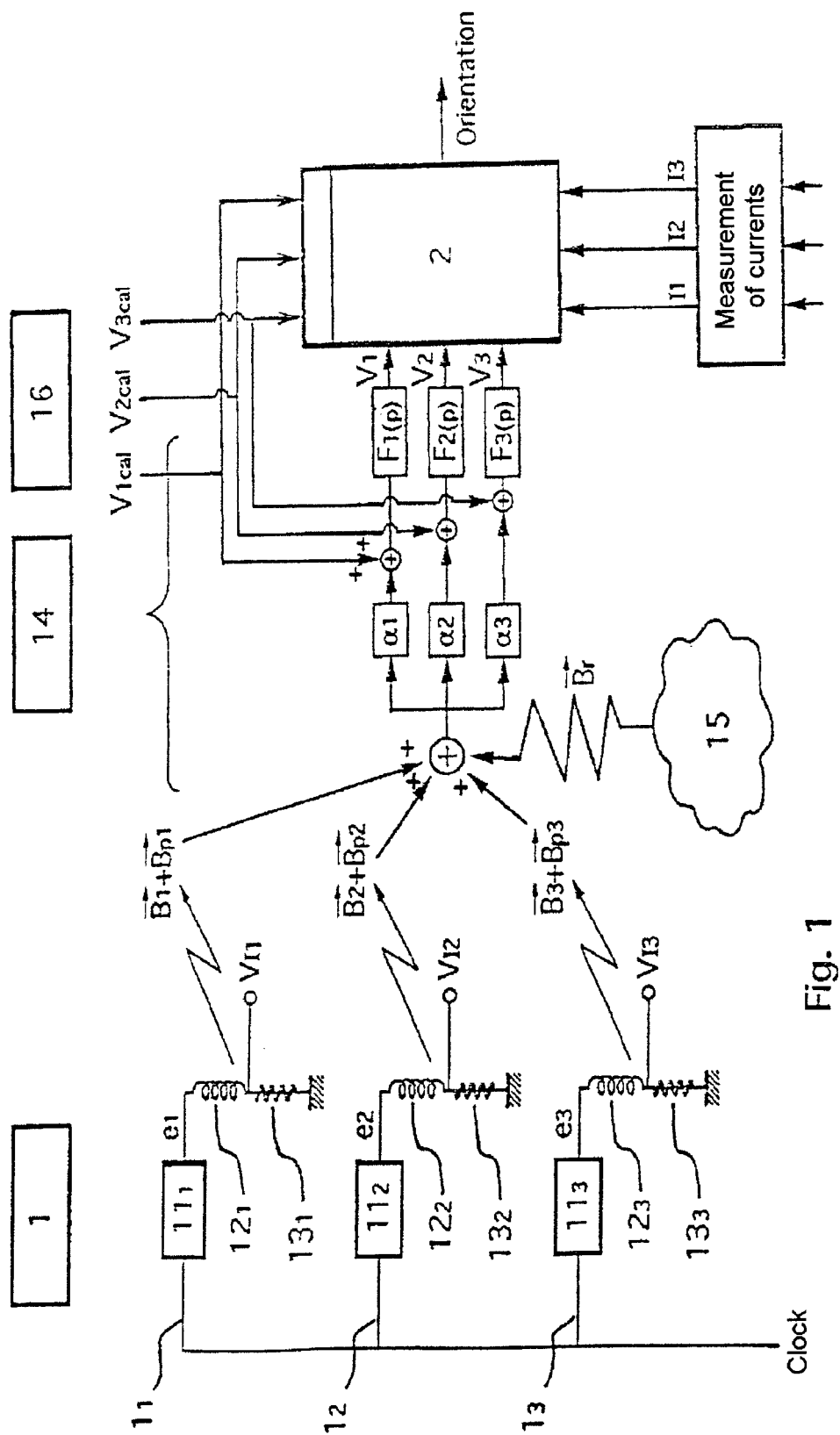
FIG. 1 depicts a schematic of the device implemented in a helmet viewfinder, comprising an emitter of magnetic field(s), a sensor of magnetic field(s), and means for filtering the magnetic disturbances according to the invention.

A mode of implementation of the filtering of magnetic disturbances, implemented in a helmet viewfinder, is depicted in relation to FIG. 1. It is assumed later on in the document that the currents injected into the coils of the emitter are unitary and constant as a function of k/T. It is then possible to merge, for the sake of simplicity, the concepts of magnetic fields and of transfer functions, defined by the ratio of the magnetic fields to the currents injected into the coils of the emitter. Obviously, the invention applies also to the case where the currents emitted are not constant in the space k/T. The concept of transfer function must then be substituted for that of magnetic field in the document. In particular, the models described later on in the document are then frequency models of the transfer functions, defined by a ratio of the disturbing fields to the injected currents.

A block 1 for generating signals is made up of three channels $1_1$ to $1_3$. Each channel $1_1$ to $1_3$ comprises a generator $11_1$ to $11_3$ of current $i_{B1}$ to $i_{B3}$, a coil $12_1$ to $12_3$ and a resistor $13_1$ to $13_3$. The flow of the current in the coils $12_1$ to $12_3$ allows the creation of a magnetic field $B_1$ to $B_3$ respectively for each of the channels $1_1$ to $1_3$. The currents $i_{B1}$ to $1_{B3}$ injected into the coils $12_1$ to $12_3$ are preferably produced by current generators of internal impedance greater than 500 kΩ. According to a preferred mode of implementation, the current generators $11_1$ to $11_3$ are connected to untuned coils. The invention applies of course also to the case where the current generators $11_1$ to $11_3$ are connected to tuned coils.

Magnetic disturbances, which arise in ferromagnetic materials and/or conducting materials surrounding the helmet viewfinder device illustrated in FIG. 1, are superimposed on the fields $B_1$ to $B_3$ in the form of disturbing magnetic fields $B_{p1}$ to $B_{p3}$.

The sensor 14 receives the sum of the fields $B_1$ to $B_3$ emitted respectively by the channels $1_1$ to $1_3$ of the block for generating the signals 1, of the disturbing fields $B_{p1}$ to $B_{p3}$, and of any radiated disturbances 15 $B_r$. The sum of the fields received by the sensor 14 is then processed according to a technique described in detail in FIG. 2.

A block 16 for calibrating the sensor delivers the calibration signals $V_{1cal}$, $V_{2cal}$ and $V_{3cal}$, which do not form the subject of the present invention.

Figure 2:
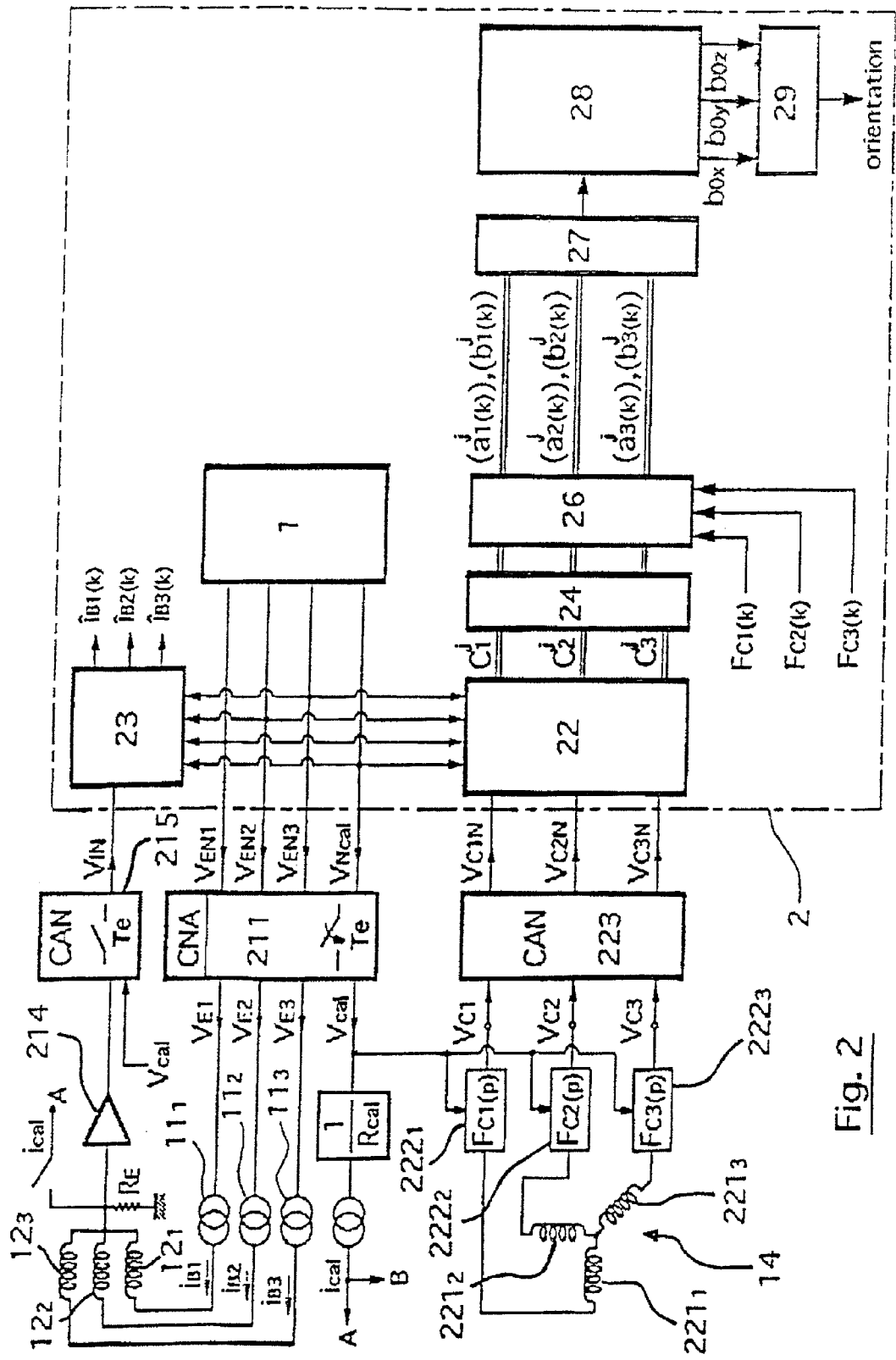
FIG. 2 illustrates the various types of processing applied to the signals implemented in the device of FIG. 1.

On completion of the various different processing applied to the fields received, the block 2, described in greater detail in FIG. 2, outputs the matrix $C_{ij}$ of the emitter-sensor couplings in free space, which makes it possible to calculate in a known manner the position and the orientation of the sensor 14 in the reference frame of the emitter 1 of the helmet viewfinder device.

The various different processing applied to the signals implemented in the device of FIG. 1 is henceforth presented in relation to FIG. 2.

Calibration signals and devices, which do not form the subject of the invention, are also represented in FIG. 2.

It will be noted firstly that the undisturbed fields emitted by a coil are proportional to the currents flowing through the coil which generates them, and that the disturbing fields created by the environment of the relevant device are a linear transformation of these currents. More precisely, the disturbing fields are a filtered version of the currents flowing through the coil, in the conventional sense of filtering.

Magnetic fields being emitted simultaneously on the three coils constituting the emission antenna of the helmet viewfinder device, it is necessary to be able to separate the fields emitted by each of the coils. There are several methods for carrying out this separation, namely temporal methods, founded for example on temporal parametric models of the signals, and spectral methods, which consist in directly estimating the spectra of the signals by projecting these signals onto vector bases.

FIG. 2 illustrates the implementation of a direct spectral identification method, but any other method may be used according to the invention, and in particular a parametric method.

In FIG. 2, a block 1 for generating signals delivers signals $V_{Enj}$ proportional to the currents $i_1$, $i_2$, $i_3$ and $i_4$, where $i_1$, $i_2$, $i_3$ are emission currents and where $i_4$ is a calibration current. We have, for example:

$$i_1(n,k) = \sum_{k'=0}^{k'=K} a_{1,k} \sin\left(\frac{2\pi}{T}(k)nT_e\right)$$

$$i_2(n,k) = \sum_{k'=0}^{k'=K} a_{2,k} \sin\left(\frac{2\pi}{T}(k)nT_e\right)$$

$$i_3(n,k) = \sum_{k'=0}^{k'=K} a_{3,k} \sin\left(\frac{2\pi}{T}(k)nT_e\right)$$

$$i_4(n,k) = \sum_{k'=0}^{k'=K} a_{4,k} \sin\left(\frac{2\pi}{T}(k)nT_e\right)$$

where $k=k_1+lk'$, $l \geq 3$, $k_1$, $k_2$, $k_3$, $k_4$, K, l, and n are integers, the coefficients $a_{jk}$ are non-zero for particular values of k (for example $\forall k$, j $a_{jk}=1$) and $\forall i$, j$\in[1;4]$, $|k_i-k_j|=E(l/3)$, where E denotes the integer part function, T represents the duration of integration of the measurement, and $T_E$ is a sampling period.

At the output of the block 1, the signals $V_{Enj}=R_{Ej}*i_j$ are sent to a digital analogue converter 211, where they are converted into analogue voltages $V_{Ej}$ at the rate $1/T_E$. According to a variant of the invention, the conversion is effected at a rate which is a multiple of $1/T_E$.

The analogue voltages $V_{E1}$, $V_{E2}$ and $V_{E3}$ energize three current generators $11_1$, $11_2$ and $11_3$ which deliver the currents $i_{B1}$, $i_{B2}$ and $i_{B3}$ flowing respectively through the three orthogonal emission coils $12_1$, $12_2$ and $12_3$.

The electrical quantities emanating from the coils $12_1$, $12_2$ and $12_3$ are then amplified by the block 214, and sampled at the rate $T_E$ with the aid of the analogue digital converter 215.

The analogue digital converter 215 delivers a digital voltage $$V_{IN} = R_E * \sum_{j=1}^{4} i_3$$

which supplies the block 23, $i_{B4}$ being likened to $i_{cal}$. The block 23 implements a measurement of the voltages $V_{IN}$, which are projected onto vector bases $V_{Enj}(t, k)$. According to a preferred mode of implementation of the invention, the vector bases $V_{Enj}(t, k)$ are orthonormal. The block 23 therefore makes it possible to measure the currents $i_{B1}$, $i_{B2}$ and $i_{B3}$ flowing through the three emission coils $12_1$, $12_2$ and $12_3$, and delivers three signals $\hat{i}_{B1}(k)$, $\hat{i}_{B2}(k)$, and $\hat{i}_{B3}(k)$ respectively estimated from $i_{B1}$, $i_{B2}$ and $i_{B3}$.

The orthogonal coils $221_1$, $221_2$ and $221_3$ constituting the sensor 14 receive a magnetic field corresponding to the sum of the fields emitted by the emission coils $12_1$, $12_2$ and $12_3$ and of disturbing fields. The blocks $222_1$, $222_2$ and $222_3$ diagrammatically represent the transfer functions of the three channels of sensor 14. The calibration voltage $V_{cal}$ is sent sequentially to each of the blocks $222_1$, $222_2$ and $222_3$, in the form of the calibration signals $V_{1cal}$, $V_{2cal}$ and $V_{3cal}$, delivered by the block 16 for calibrating the sensor illustrated in FIG. 1. We thus have:

$V_{1cal}=V_{cal}(t_1<t<t_2)$
$V_{2cal}=V_{cal}(t_2<t<t_3)$
$V_{3cal}=V_{cal}(t_3<t<t_4)$ where $t_1$ to $t_4$ denote predetermined instants.

At the output of the blocks $222_1$, $222_2$ and $222_3$, the magnetic fields received by the reception coils $222_1$, $222_2$ and $222_3$ are transformed into analogue voltages $V_{C1}$, $V_{C2}$ and $V_{C3}$. The analogue digital converter samples the voltages issued from the sensor $V_{C1}$, $V_{C2}$ and $V_{C3}$ respectively as digital voltages $V_{C1N}$, $V_{C2N}$ and $V_{C3N}$. These digital voltages supply the block 22.

The block 22 implements the projection of the voltages $V_{C1N}$, $V_{C2N}$ and $V_{C3N}$ onto the vector basis $V_{Enj}(t,k)$, j varying from 1 to 4, and onto the vector basis which is the Hilbert transform of the basis $V_{Enj}(t,k)$, in such a way as to output a 3×3 complex matrix $C_i^j$, as well as certain terms related to the calibration signals, which do not form the subject of the present invention. The vectors $C_i^1$, $C_i^2$, $C_i^3$ emanating from the matrix $C_i^j$ supply the block 24 for separating the measurement and the calibration.

According to a technique which does not form the subject of the present invention, the block 24 makes it possible to perform a separate measurement of the currents and of the voltages of the device, so as to obtain better accuracy of the measurement, without influence of the environment and of the phenomenon of aging. The signals $i_{B1}$, $i_{B2}$, $i_{B3}$ and $i_{cal}=i_4$ being disjoint in frequency, it is easy to separate, at the output of the sensor 14, the electrical quantities dependent on the calibration signals, from the electrical quantities dependent on the fields measured by the sensor 14. After projection of the digital voltages $V_{C1N}$, $V_{C2N}$ and $V_{C3N}$ onto the orthogonal vector bases $V_{Enj}(t,k)$, the distribution of the energy of the signals in the space k/T is obtained. The bases $V_{Enj}(t,k)$ being disjoint in the k/T domain, it is thus possible, on the one hand, to separate the calibration signals from the measurement signals and, on the other hand, to separate the components of each of the signals received by the sensor 14.

The complex 3×3 matrix $C_i^j$ is presented, in Cartesian form (real part, imaginary part), to the input of the processing block 26. The complex transfer functions $222_1$ to $222_3$ of the three channels of the sensor 14 also feed the block 26, in the form of transfer functions in polar coordinates ($\rho_i(k)$, $\phi_i(k)$). After transformation of the elements of the matrix $C_i^j$ from the Cartesian form (real part, imaginary part) to a form in polar coordinates ($\rho_{is}^j(k)$, $\phi_{is}^j(k)$), the block 26 carries out a division of the modulus $\rho_{is}^j(k)$ by the modulus $\rho_i(k)$, and a subtraction of the angle $\phi_i(k)$ from the angle $\phi_{is}^j(k)$, so as to output a complex 3×3 matrix, corrected of the transfer functions $222_1$ to $222_3$ of the sensor 14, in polar form ($\rho_{is\ cor}^j(k)$, $\phi_{is\ cor}^j(k)$), which is transformed into Cartesian coordinates.

The complex 3×3 matrix, corrected of the transfer functions $222_1$ to $222_3$ of the sensor 14, then feeds the block 27 for forming normalized matrices, which supplies the block 28 with a normalized matrix in Cartesian form [$a_i^j(k)$, $b_i^j(k)$], where the terms $a_i^j(k)$ represent the real parts of the terms of the complex 3×3 matrix input to the block 27, in the form of discrete frequencies, and where the terms $b_i^j(k)$ represent the imaginary parts of these terms. The normalization consists in carrying out the following operation:

$$\rho_i^j(k) = \frac{\rho_{iscor}^j(k)}{\rho_{0i}^j(k)} \text{ where } \rho_{0i}^j(k) = \sqrt{(a_i^j(k))^2 + (b_i^j(k))^2}.$$

According to the notation used, the index j denotes the index of the coil for emitting the magnetic field measured by the sensor 14, and the index i denotes one of the components of the field $B^j$ emitted by the emission coil $12_j$. The block 28 implements a modeling of the fields received by the sensor 14, on the basis of the following modeling terms:

$$\vec{B}(\vec{x},j\omega)=[\vec{B}_E(\vec{x})+\vec{B}_{EF}(\vec{x},j\omega)+\vec{B}_{FE}(\vec{x},j\omega)]I_j(j\omega)e^{j\omega t}$$

and after dividing by $I_j(j\omega)e^{j\omega t}$:

$$\vec{B}_{EF}\left(\vec{x}, j\frac{k}{T}\right) = \vec{B}_{EF}(\vec{x}) * \frac{jk\tau_{ef}}{T+jk\tau_{ef}} \quad (1)$$

$$\vec{B}_{FE}\left(\vec{x}, j\frac{k}{T}\right) = \vec{B}_{FE}(\vec{x}) * \frac{T}{T+jk\tau_{fe}}$$

where the modeling term $B_{EF}(\vec{x}, j\omega)$ represents the disturbing fields of the type of eddy effects (or the transfer function defined by the ratio of the disturbing fields of the type of eddy effects to the currents injected into the emitter), and where the modeling term $\vec{B}_{FE}(\vec{x}, j\omega)$ represents the disturbing fields of ferromagnetic type (or the corresponding transfer function).

The block 28 implements an algorithm founded on known iterative techniques, which makes it possible to fit a model which is nonlinear with respect to its parameters. Thus, by minimizing a criterion of quadratic sum of the errors between the model (1) above and the data [$a_i^j(k)$, $b_i^j(k)$] input to the block 28, we obtain at output a field $\vec{B'}_E^j(\vec{x})$ (or the corresponding transfer function) which is constant as a function of k/T. According to a variant of the invention, the constants of the model of the disturbing fields varying with frequency can also be output by the block 28.

The field $\vec{B'}_E^j(\vec{x})$ supplies the block 29 for estimating the field $\vec{B}_E(\vec{x})$, which is the magnetic field emitted in free space, that is to say in an undisturbed magnetic space, and which is constant as a function of the parameter k. The block 29 therefore makes it possible to form the matrix of the fields which would be emitted by the emission coils $12_1$ to $12_3$ in free space, and from which are estimated, according to a technique which does not form the subject of the present invention, the coordinates $\vec{x}$ of the center of the sensor in the reference frame of the emitter, so as to determine the position and the orientation of the helmet viewfinder in the aircraft.

The block 2 of FIG. 2 represents the assembly of the means implemented in the device according to the invention for generating and acquiring the signals useful for the determination of the position and of the orientation of the helmet viewfinder.

Figure 3:
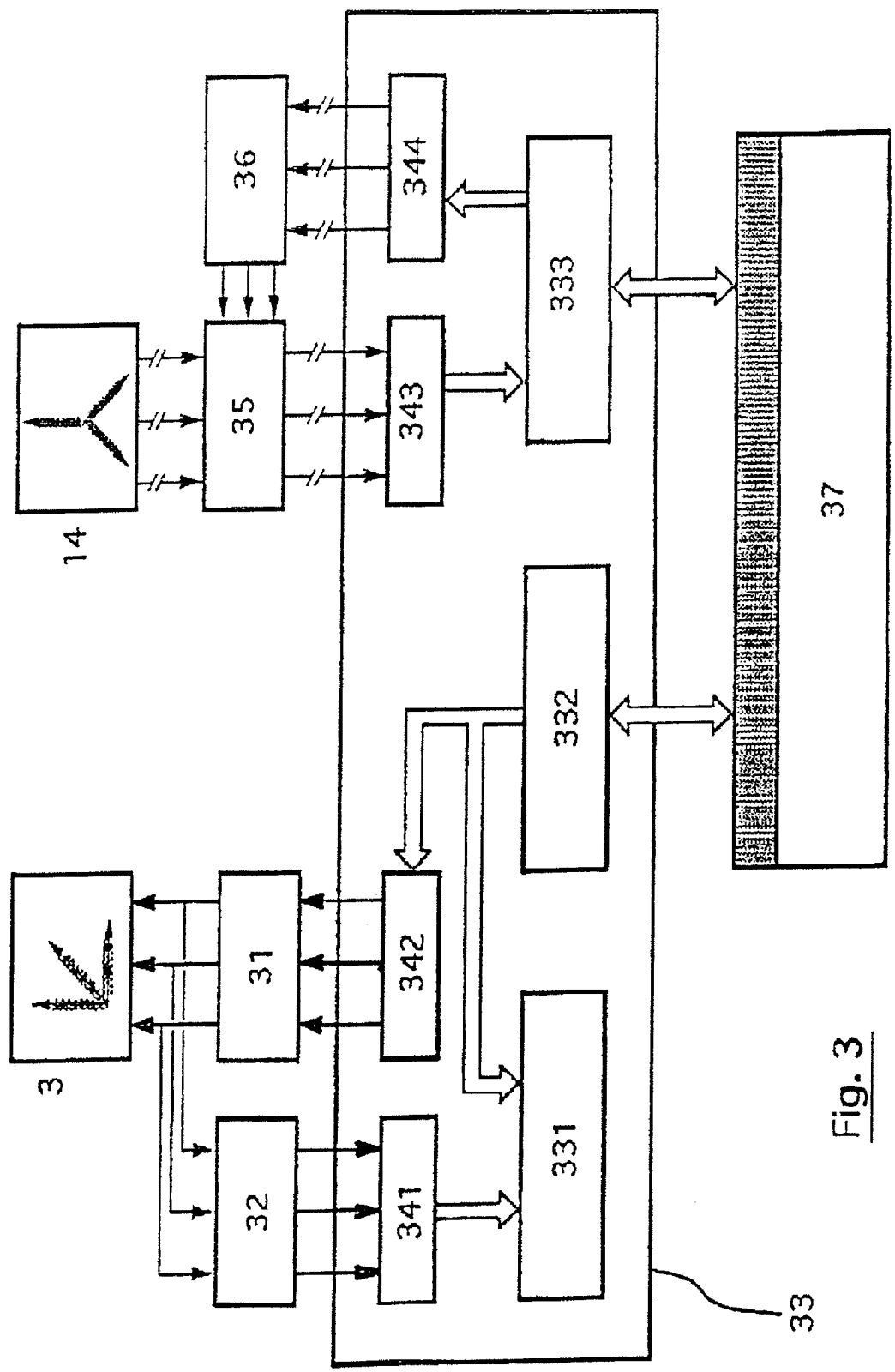
FIG. 3 illustrates a possible functional embodiment of the device of FIG. 1.

A possible functional embodiment of the device illustrated by FIG. 1 is presented henceforth in relation to FIG. 3. The device comprises two antennas 3 and 14, made up of three substantially orthogonal coils, and which are respectively antennas for emitting and for receiving magnetic field(s).

The emission antenna 3 is connected to the blocks 31 and 32, which comprise respectively the emission electronics and the emission measurement electronics. The blocks 31 and 32 are in communication with the interface and computation card 33.

The card 33 encompasses three main functional blocks, namely a calibration and correction block 331 associated with the emission antenna 3, a block 332 for generating digital signals, and a calibration and correction block 333 associated with the sensor 14.

The calibration and correction block 331 of the emission antenna 3 receives data originating from the block 332 for generating digital signals, and from the emission measurement electronics block 32, by way of an analog digital converter 341, which samples the signals emanating from the block 32.

The digital signals generated by the block 332 are converted into analog signals by the digital analog converter 342, then sent to the emission electronics block 31.

The fields received by the sensor 14 are processed by the block 35 which represents the sensor's detection electronics. The signals emanating from the block 35 are sampled by the analog digital converter 343, then sent to the calibration and correction block 333 associated with the sensor.

The block 333 moreover emits digital signals which feed the digital analog converter 344, and which are sent, after conversion, to the calibration electronics block 36, which implements the calibration of the sensor's detection electronics block 35.

The interface and computation card 33 exchanges data with a terminal 37, which implements in particular the computation of the filterings of the disturbing fields, the removal of the disturbing fields from the sum of the fields received by the sensor 14, and the computation of the line of aim of the helmet viewfinder.

Although a system suited to military aircraft has been described, it is clear that the invention can be implemented in other types of apparatus (vehicles for example), be they military or civil. More generally, the invention may be suited to very numerous domains, and in particular that of virtual reality.

What is claimed is:

1. A device for measuring position and the orientation of a mobile object with respect to a fixed structure, in a disturbed magnetic environment, comprising:
    a first assembly of at least two first orthogonal coils configured to emit at least one predetermined magnetic field, secured to the fixed structure, and defining a reference frame;
    a second assembly of at least two second orthogonal coils configured to receive at least one magnetic field, secured to the mobile object, and forming a sensor, each of the second coils belonging to a channel of the sensor;
    means for simultaneous and continuous emission of predetermined magnetic fields, on each of the first coils of the first assembly;
    first means of measuring, on each of the channels of the sensor, a vector sum of the predetermined magnetic fields emitted and of disturbing fields produced by the environment of the device;
    means of evaluating the disturbing fields;
    first means of estimating the predetermined-magnetic fields emitted in an undisturbed magnetic environment, by eliminating the disturbing fields evaluated in the vector sum; and
    means for calculating a position and orientation of the first object in reference frame, from the estimation of the predetermined magnetic fields.

2. The device as claimed in claim 1, wherein the means for evaluating the disturbing fields comprises means for projection vector sum onto a first basis of disjoint orthonormal signals in the space k/T, where k is an integer and where T is a period of integration of measurement of the vector sum, and onto a second basis that is a Hilbert transform of the first basis.

3. The device as claimed in claim 2, wherein the means for evaluating the disturbing fields comprises means for identifying, within the projected vector sum, elements varying in the space k/T.

4. The device as claimed in claim 1, wherein the predetermined magnetic fields emitted are obtained by injecting currents into the first coils of the first assembly, and wherein the predetermined magnetic fields emitted are proportional to the injected currents.

5. The device as claimed in claim 4, wherein the means for evaluating comprises second means estimating a frequency model of the disturbing fields or of a frequency model of transfer functions defined by a ratio of the disturbing fields to the injected currents.

6. The device as claimed in claim 5, wherein the frequency model of the transfer functions comprises first terms for modeling the transfer functions of the disturbing effects of eddy effects $\vec{B}_{EF}(\vec{X},j\omega)$, and second terms for modeling the transfer functions of disturbing effects of ferromagnetic type $\vec{B}_{FE}(\vec{X},j\omega)$, the first and second modeling terms configured to be polynomials in k/T or of the type:

$$\vec{B}_{EF}\left(\vec{X}, j\frac{k}{T}\right) = \vec{B}_{EF}(\vec{X}) * \frac{jk\tau_{ef}}{T + jk\tau_{ef}}$$

$$\vec{B}_{FE}\left(\vec{X}, j\frac{k}{T}\right) = \vec{B}_{EF}(\vec{X}) * \frac{T}{T + jk\tau_{fe}}$$

where $\tau_{ef}$ and $\tau_{fe}$ denote time constants characteristic of materials in which the eddy effects and ferromagnetic effects respectively arise, where k is an integer, and where T is a period of integration of the measurement of said vector sum.

7. The device as claimed in claim 4, wherein the predetermined magnetic fields emitted are orthogonal pseudorandom fields, whose spectral distribution in terms of amplitude is proportional to that of the injected currents.

8. The device as claimed in claim 1, wherein the predetermined magnetic fields emitted have disjoint spectral supports.

9. The device as claimed in claim 1, wherein the first assembly comprises three orthogonal coils for emitting the at least one predetermined magnetic field, and wherein the second assembly comprises three orthogonal coils for receiving the at least one magnetic field.

10. The device as claimed in claim 1, wherein the at least one predetermined magnetic fields emitted exhibit respectively at least two reference frequencies, the reference frequencies being situated in a chosen spectral domain while taking account of an environment of the device, such that the disturbing fields alter greatly in the spectral domain.

11. The device as claimed in claim 10, wherein the at least one predetermined magnetic fields emitted exhibit respectively at least four reference frequencies.

12. The device as claimed in claims 10, wherein the reference frequencies are multiples of a predetermined frequency, the predetermined frequency being a submultiple of a frequency lying between 40 and 70 Hz.

13. The device as claimed in any one of claim 4, further comprising:
    second means for measuring and calibrating the injected currents;
    third means for measuring and calibrating electrical quantities emanating from the channels of the sensor;
    means of digital acquiring the emitted fields, with acquisition period $T_E$;
    means of compensating transfer functions of the channels of the sensor.

14. The device as claimed in claim 13, wherein the means for digitally acquiring is preceded by at least one anti-aliasing filter.

15. The device as claimed in claim 4, wherein the injected currents are formed of a linear combination of first components:

$$i_1(n, k) = \sum_{k'=0}^{k'=K} a_{1k} \sin\left(2\frac{\pi}{T}(k)nT_e\right)$$

$$i_2(n, k) = \sum_{k'=0}^{k'=K} a_{2k} \sin\left(2\frac{\pi}{T}(k)nT_e\right)$$

$$i_3(n, k) = \sum_{k'=0}^{k'=K} a_{3k} \sin\left(2\frac{\pi}{T}(k)nT_e\right)$$

where $k = k_1 + lk'$, $l \geq 3$, $k_1$, $k_2$, $k_3$, $K$, $l$, and $n$ are integers, coefficients $a_{jk}$ are non-zero for particular values of k, $T_E$ is a period of acquisition of the emitted at least one predetermined magnetic field, and $\forall i, j \in [1;3]$, $|k_i - k_j| = E(1/3)$, where E denotes an integer part function.

16. The device as claimed in claim 5, wherein the means for evaluating the disturbing fields further comprises;

means for projecting the vector sum onto a first basic of the injected currents, and onto the Hilbert transform of the first basis, to separate the vector sum into components, each of the components corresponding to a field emitted by one of the first coils of the first assembly;

means for reconstructing, over a temporal support T and at each acquisition period $T_E$, the components over the first basis of the injected currents and over the Hilbert transform of the first basis;

means for constructing, in the space k/T, from the components reconstructed over the first basis, and over the Hilbert transform of the first basis, two 3×3 matrices, nine terms of each of the matrices being functions of the variable k/T, where k is an integer bounded above by $T/T_E$.

17. The device as claimed in claim 1, further comprising means for digital filtering, aimed at eliminating any disturbances radiated in an environment of the device.

18. A process for measuring position and orientation of a mobile object with respect to a fixed structure, in a disturbed magnetic environment, a first assembly of at least two orthogonal coils for emitting at least one predetermined magnetic field, secured to the fixed structure, defining a reference frame, a second assembly of at least two orthogonal coils for receiving at least one magnetic field, secured to the mobile object, and forming a sensor, each of the coils belonging to a channel of the sensor, the process comprising:

simultaneously and continuously emitting at least one predetermined magnetic fields, on each of the first coils of the first assembly;

measuring, on each of the channels of the sensor, a vector sum of the at least one predetermined magnetic field emitted and of disturbing fields produced by an environment of the device;

evaluating the disturbing fields;

estimating the at least one predetermined magnetic field emitted in an undisturbed magnetic environment, by elimination of the disturbing fields evaluated in said vector sum; and calculating position and orientation of the first object in the reference frame, from the estimation of said predetermined magnetic fields.

\* \* \* \* \*